United States Patent [19]

Alefeld et al.

[11] 4,408,468
[45] Oct. 11, 1983

[54] SYSTEM COMPRISING AT LEAST ONE ABSORPTION HEAT PUMP

[75] Inventors: Georg Alefeld, Josef-Raps-Strasse 3, Munich 40; Peter Maier-Laxhuber, Munich, both of Fed. Rep. of Germany

[73] Assignee: Georg Alefeld, Munich, Fed. Rep. of Germany

[21] Appl. No.: 188,120

[22] Filed: Sep. 17, 1980

[30] Foreign Application Priority Data

May 16, 1980 [EP] European Pat. Off. .......... 80 102725
Sep. 17, 1979 [DE] Fed. Rep. of Germany ....... 2939423

[51] Int. Cl.³ .............................................. F25B 15/00
[52] U.S. Cl. ...................................... 82/476; 62/238.3
[58] Field of Search ...................... 62/101, 112, 235.1, 62/148, 236, 476, 238.3

[56] References Cited

U.S. PATENT DOCUMENTS

| | | | |
|---|---|---|---|
| 4,007,776 | 2/1977 | Alkasab | 62/235.1 |
| 4,011,731 | 3/1977 | Meckler | 62/235.1 |
| 4,034,569 | 7/1977 | Tcherneu | 62/235.1 |
| 4,134,273 | 1/1979 | Brautigam | 62/476 X |
| 4,138,850 | 2/1979 | Tcherneu | 62/235.1 |
| 4,138,855 | 2/1979 | Jahan et al. | 62/476 X |
| 4,251,997 | 2/1981 | Newton | 62/148 |
| 4,272,268 | 6/1981 | Greiner | 62/112 |

Primary Examiner—Lloyd L. King

Attorney, Agent, or Firm—Kinzer, Plyer, Dorn & McEachran

[57] ABSTRACT

In a system with at least one absorption heat pump, a working medium is generated in a generator or explusion unit by the input of heat energy of relatively high temperature, from an absorption material. The generated working medium is condensed in a condenser and then undergoes expansion in an expansion unit. The expanded, condensed working medium is evaporated in an evaporator with the input of heat energy at a relatively low temperature and the evaporated working medium is absorbed again, in an absorber, in the absorption material. The heat energy, used for generation of the working medium from the absorption material, is so stored for the heat pump that the heat energy, as taken from the store, is on hand at a temperature which is high enough for the generation of working medium from the absorption material.

The heat store may preferably take the form of a sorption store, comprising a zeolite as sorption material and forming a part of a further discontinuously operated absorption heat pump. Such a heat pump, using zeolite and, preferably H₂O as a working material system, is responsible, when used by itself, for a useful effect on producing useful heat (that is to say heat able to be utilized) at a relatively high temperature, as for example 80° to 100° C. and higher and, if desired, for producing cold as well.

18 Claims, 7 Drawing Figures

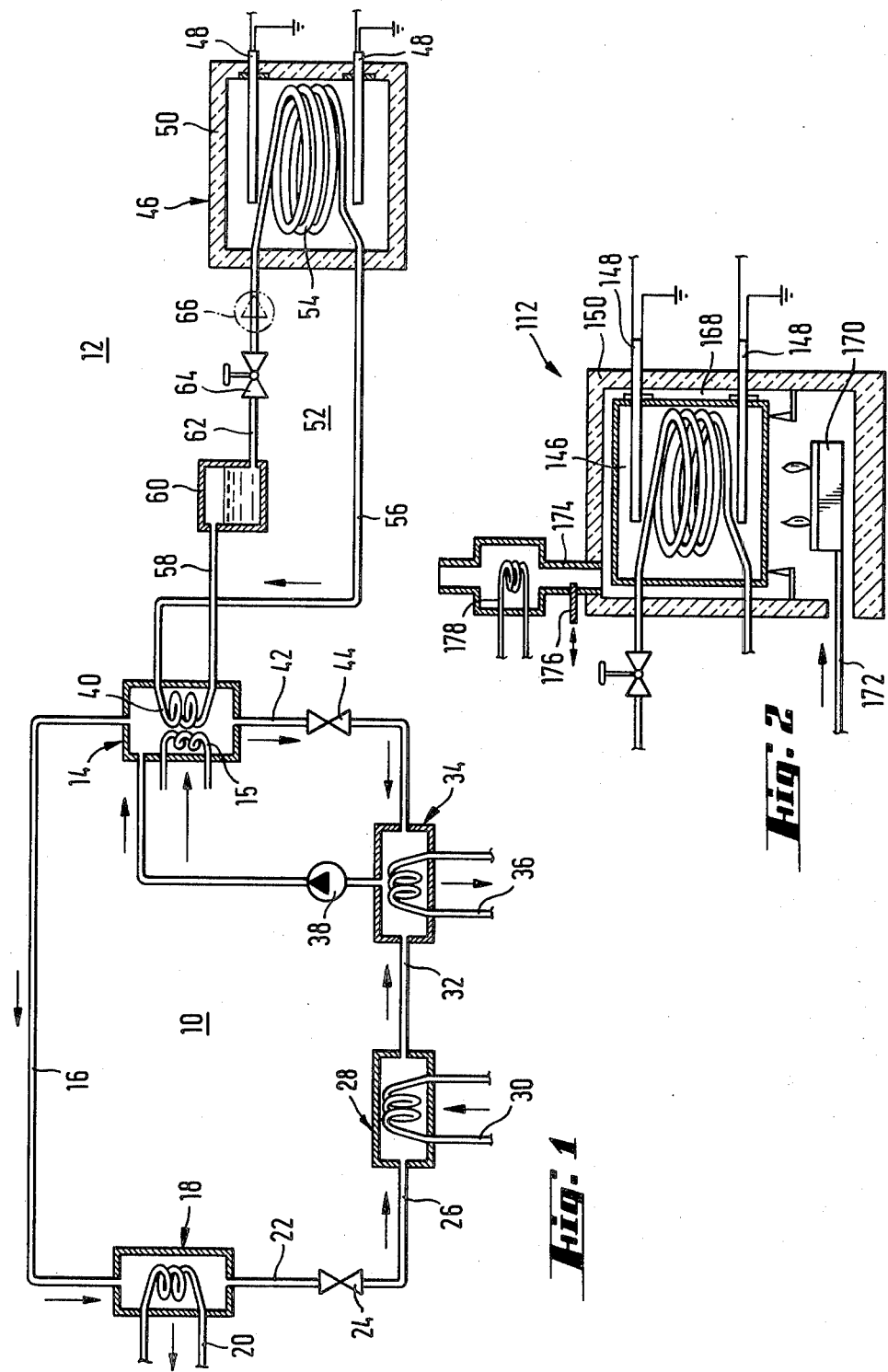

SYSTEM COMPRISING AT LEAST ONE ABSORPTION HEAT PUMP

BACKGROUND OF THE INVENTION (i) Field Covered by the Invention

The present invention relates to a process for the operation of a system comprising at least one absorption heat pump, in which a working medium or fluid is generated or expelled, by the input of heat energy at a relatively high temperature, from an absorption material, the generated working medium is condensed, the condensed working medium undergoes expansion, the expanded, condensed working medium is evaporated by the input of heat energy at a relatively low temperature, and the evaporated working medium is lastly absorbed again in the absorption material. Furthermore, the invention relates to forms of plant for effecting such a process.

(ii) The Prior Art

For making the best economic use of fossil and nuclear energy supplies on hand, heat pumps have of late come to play an increasingly important part for heating purposes, in addition to their use in refrigeration and cooling systems, which have been in existence for a much longer time. One shortcoming in this connection, which has so far not been completely taken care of, is with respect to supplying a heat pump with input energy. Compressor heat pumps, powered by an electric motor, have the shortcoming of needing their own further power from the public electricity line and such further power may well be, in fact, needed at the same time as the peak load on the public electricity line. This is true not only for heating, but furthermore for cooling (that is to say generally "temperature control") of rooms. While it is true that this shortcoming may be taken care of by the heat pump only being run at off-peak times, more specially overnight, and by the heat or cold being stored in a heat or cold storing unit, from which it may then be taken as needed, the heat coming from a heat pump is generally at low temperatures so that low-temperature heat storing units of great size would be needed for storing the necessary amount of heat. Much the same would furthermore be true for the storing of cold.

Absorption heat pumps may be supplied with input power or energy by oil or gas burners so that some of the shortcomings noted for electric motor-powered compressor heat pumps are taken care of. Absorption heat pumps, supplied with input power by a gas or oil burner, have, however, their own special shortcomings: Economic use of the primary energy makes it necessary for the cold and/or heat output of the heat pump to be kept in step with the heat need at the time in question, that is to say the plant's output rate has to be controllable. However, stepless control of oil burners has turned out to be difficult. On-off automatic control has, on the one hand, not given anything like the same efficiency as continuous control and, furthermore, at times when the heat need is generally low, in which the on-times of the burner are generally short and separated by long off times, there is the danger of the combustion by products being condensed in the chimney or stack. The supply rate from a public gas system furthermore has an upper limit and, generally speaking, in this case as well, smooth loading of the system without any sudden increases at peak loading times is desired. Furthermore, when the oil or gas heating is turned off, there will be great heat losses because of the convection through the chimney, which may not be stopped. Electric heating of absorption heat pumps produces the same shortcomings with respect to loading of the public line as driving of a compressor heat pump by an electric motor.

In the U.S. Pat. No. 4,070,870 (Bahel et al.) a suggestion has been made for producing hot water with the energy of the sun and storing it in a supply vessel for use, if heat is needed, simply for heating purposes or, if cooling is needed, using it for heating (after further heating in the condenser of a compressor heat pump) the generation unit of an absorption refrigeration machine. The heat energy, stored in the hot water, can not, as such, be used for operation of the absorption refrigeration machine, however, because of its low temperature level.

In the U.S. Pat. No. 4,034,569 (in part the same as the German Offenlegungsschrift specification No. 2,720,561 (Tschernev)), an account is given of a cooling system, working on the same lines as an absorption refrigeration or cooling machine, with, for example, a zeolite-water working medium system, and with heating with energy from the sun. Because, on producing a cooling effect, the generation unit is heated by solar energy, the working medium, evaporated on producing a cooling effect, has to be stored till absorption takes place again. For that reason, it is only the working medium and not the input or useful energy which is stored. U.S. Pat. Nos. 4,138,861 (Wurm) and 4,169,362 (Weil et al) disclose solid adsorption air conditioning apparatus using, inter alia, the system zeolite-water as an adsorbent-working fluid system. It is, however, not to be seen from these publications that zeolite has properties making it useful as an absorption material for an absorption heat pump system in which not only useful heat at a relatively high temperature level is produced, but, in addition to the heating effects, cooling effect (cold) is obtainable and, further operation-energy for a subsequent heat pump may be stored with good effect.

The German Pat. No. 596,308 (Normelli) describes a discontinuously working absorption refrigeration or cooling machine, in which the working medium is generated, is condensed and stored, when cheap energy, as for example overnight electricity, is on hand, at a later point in time, when a cooling effect is desired, the stored working medium is evaporated, for producing such a cooling effect, and absorbed again. The heats of condensation and absorption are to be used as well. However, wide-scale use of this system has so far not been possible because the right sort of absorption medium/working medium systems have not so far been designed, and it is, furthermore, not to be seen from the above patents that zeolite would be useful for a system, working with completely different operation properties of the type disclosed below.

Lastly, multi-stage absorption heat pumps have been suggested in German Pat. Nos. 620,249; 671,791 and 678,942, the first stage heat pump being utilized as a heat store. The operation heat or driving heat supplied to the first stage has so far been limited to temperatures below about 180° C., because practical working medium systems for higher temperatures were not available. Further these multi-stage systems do not make optimum use of the heat output of the first stage.

SHORT OUTLINE OF THE INVENTION

For these reasons, one purpose of the present invention is that of designing a system or a plant for producing heat and/or cold with at least one absorption heat pump, which makes possible low-price operation and the best possible use of energy sources on hand.

This and other purposes are effected in a system comprising at least one absorption heat pump, wherein the driving or input energy to the heat pump is stored in at least one of the following forms: specific heat, latent heat and heat stored in a zeolite by expelling an absorbed medium or fluid.

According to a first aspect of the invention, the heat or cold energy, which may be used for heating or cooling purposes as necessary; is not stored as known, rather it is the driving or input heat energy at a relatively high temperature for the absorption heat pump which is stored. That is to say, heat energy is stored which, on heating is further increased by the heat pump before use for heating purposes or, on cooling, is latter used for producing cold (cooling effect).

The heat energy for a generation unit of the heat pump has to be stored, naturally enough, within a temperature range, which is wide enough for operation of the generation unit of the absorption heat pump, for which purpose an operation temperature range of the storing unit from 200° C. to about 100° C. may be great enough. Specially useful effects are, however, produced on using a "high temperature heat storing unit", that is to say a heat store, whose upper limit to the operation temperature (temperature of the storing medium at the end of charging) may be 800° C. and more and, generally, will be greater than 180° C. or, more specially, greater than 200° C. or 250° C.

A further important aspect of the present invention is to provide an absorption storing system, making possible the storing of the driving heat for an absorption heat pump at high enough temperatures and, furthermore, able to operate as an absorption heat pump. This absorption heat pump, operating with a special absorption medium/working medium system along new lines, may be used with very good effect for heating and/or cooling purposes by itself, that is to say without any output second heat pump supplied by it with driving or input heat energy (generation heat).

Because of the use of a heat store for the input energy for the absorption heat pump, great benefits are achieved by my invention in a number of different directions: The heating apparatus, supplying the heat to be stored in the heat store, may be run under the best possible operation conditions. On using an electric heating system for the storing of heat in the heat store, cheap-rate electricity may be used overnight, or electricity which is not otherwise needed may be used at times of low loading. Furthermore, in the heat store, the waste heat of an engine, a turbine or an industrial process may be stored. On heating the store with fuel, the burner may be operated under optimum conditions and with long on times. Then the store may be heat-insulated or cut off so that no stack losses will take place.

Automatic control on the heat-producing side is unnecessary, and, in place of this, the absorption heat pump may be automatically controlled by withdrawing from the store the amount of stored energy needed at any given time. The wording input or "driving energy"- (operation energy) is to be taken, for this reason, herein to have the sense of the heat energy used in the generation unit for driving out (generating) the working medium from the absorption material, it having a relatively high temperature. The wording is not to be taken to have the sense of the heat energy supplied to the evaporator of the heat pump, this heat energy having a relatively low temperature.

The preferred embodiments of our invention's heat storing units, which are described in detail below are completely safe, are not the cause of any damage to the environment, and may be run with materials which are not poisonous or corrosive.

In comparison with storing heat and/or cold as supplied by a heat pump run on cheap rate electricity in the night, there is the further useful effect or step forward that, even with the use of overnight electricity, the heat pump may be used in the daytime, in which, generally the greater part of the heat and/or cold (cooling effect) is needed. Furthermore, in the daytime, generally the heat needed for the evaporator will be on hand at a higher temperature level than overnight so that useful heat may be produced at a higher temperature level and/or the heat pump may be run with a higher efficiency.

The wording "absorption heating pump" is herein to be taken to have the sense of resorption heat pumps as well; in this case evaporation and condensation of the working medium are the same in function as desorption and resorption.

LIST OF FIGURES

An account will now be given of the teachings of the invention using working examples as based on the figures.

FIG. 1 is a diagrammatic view of a first embodiment of a system in accordance with the invention.

FIG. 2 is a view of a modified part of the system of FIG. 1.

DESCRIPTION OF EMBODIMENTS OF THE INVENTION

Figure 3:
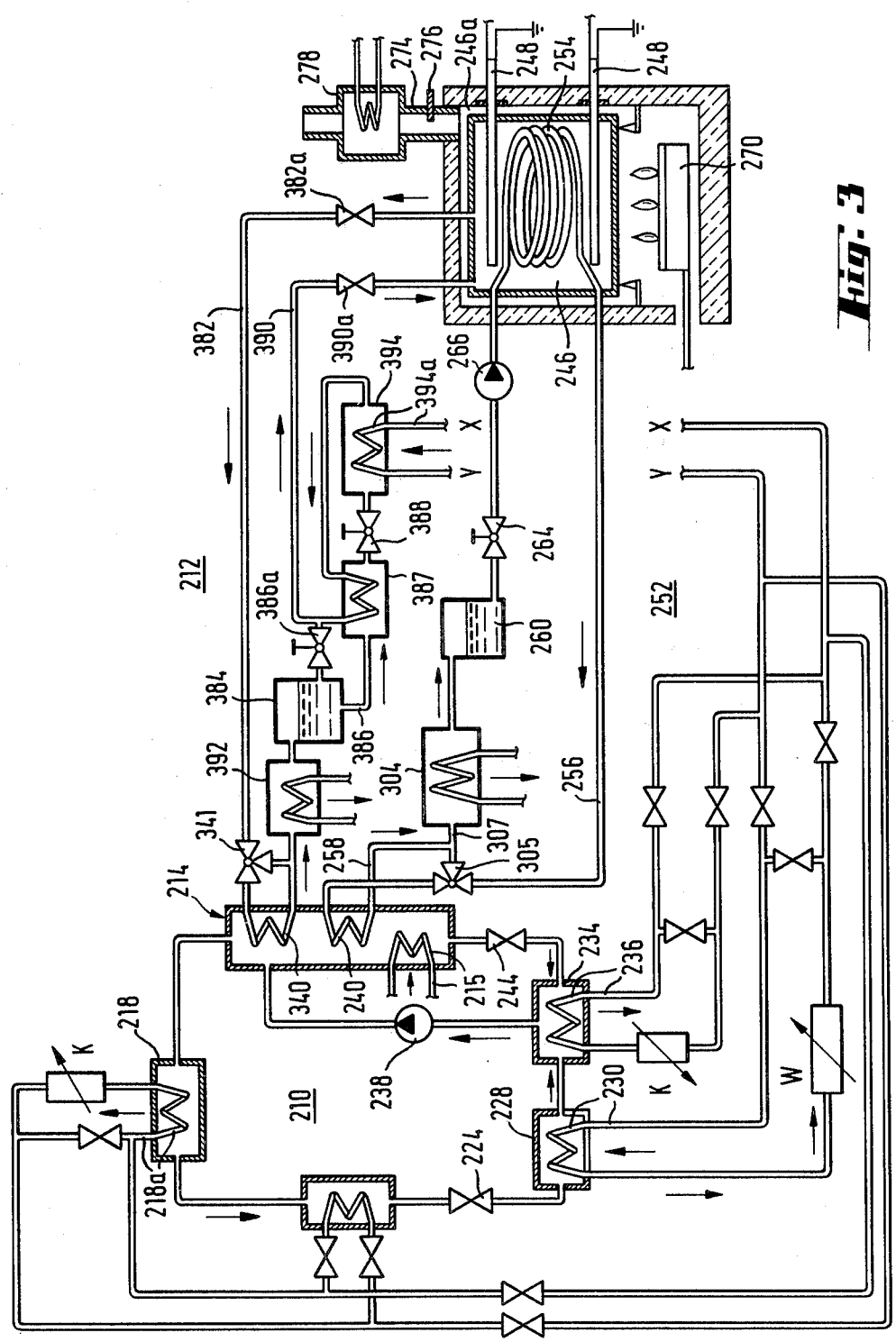
FIG. 3 is a diagrammatic view of a preferred embodiment of the present invention.

The system shown in FIG. 1, which may be used for heating and/or cooling, includes an absorption heat pump, generally numbered 10, and a heating apparatus, generally numbered 12, for a generation or expulsion unit 14 of the heat pump 10. The generation unit 14 comprises as usual, an absorption material for absorption of a working medium, which may undergo generation or expulsion, by heating, from the absorption material again.

The generation unit 14 has an outlet for working medium in gas form, coupled by a pipe 16 to a condenser 18 operating as a heat exchanger, and having a heat outlet 20. In a system designed for heating, there will be output of useful heat (heat made use of) at this point while, in the case of a cooling plant only, this will be the take-off point for waste heat.

Coming from condenser 18, liquefied working medium goes by way of pipe 22, a throttle valve 24 and a pipe 26 into an evaporator 28, which operates as a heat exchanger and has a heat input 30 by way of which the heat energy goes in, which is necessary for evaporation of the liquefied and depressurized working medium. On use of the system for cooling, the heat input 30 will take up the heat which is to be removed. The evaporated working medium goes by way of pipe 32 to an absorber 34, in which the working medium vapor is absorbed by the absorption material, giving up heat of absorption, which goes to a useful heat or waste heat output 36 of the absorber.

The absorption material, having taken up the working medium, is transported by way of pump 38 into the generation unit 14, which has a heat input part, for example in the form of a heating tube coil 40. Because of the input of heat, the working medium is regenerated from the absorption material again and the absorption material, then depleted of working medium, goes by way of an absorption material output line 42 and a throttle 44 into absorber 34.

The absorption heat pump 10 operating continuously has further parts of normal design, not given in the figure to make the view simpler, as for example heat exchangers between absorption solvent with a high and with a low level of working medium, and between working medium in liquid and gas forms. It is, however, possible to make use of a discontinuously working heat pump, of which an account will be given, for example, in connection with FIG. 3 (portion 212).

The heating apparatus 12 for the absorber heat pump 10 preferably comprises a high-temperature heat store 46. The wording "high-temperature heat store" is to be taken to have the sense of a heat store, which is worked with an upper operation temperature limit of the storing medium greater than 250 and, more specially greater than 400° C., up to more than 800° C. Such high temperature heat storing units are known in the art and, in part, have been produced with a high level of technical development. Examples of such conventional high-temperature heat stores are, for example (a) ceramic stores with, for example, MgO-ceramic material; (b) salt stores, making use of the heat of fusion of salts, for example LiF; (c) cast iron stores and (d) sorption stores. Further details and observations on the design of a sorption store for the present purposes will be given in connection with FIG. 3.

In the case of the working example of FIG. 1, the heat store 46 is heated up or "charged" by electrical heating elements 48. The storing medium itself is naturally shut off in a heat-insulating housing 50, which is only roughly outlined in the figure.

For transport of the stored heat from the heat store or storing unit 46 to the generation unit 14, use may be made of a heat carrier circuit 52, which has a pipe coil 54, placed in the heat store, and which, by way of a pipe 56 is joined with the inlet of the pipe coil 40, forming the heat input part, in the generation unit 14. The outlet of the pipe coil is joined by way of pipe 58 with an intermediate store 60, from which a pipe 62, having a control valve 64, goes to the inlet of pipe coil 54. If the heat carrier or transfer is water, the pipe 56 is used for steam, which will be condensed in the coil 40 giving up heat. The condensed water then goes by way of pipe 48 into the inbetween store 60, from which the water goes, as needed, by way of the automatic control valve 64, joined up with an automatic control system, back into the pipe coil 54, in which it is evaporated again.

With the help of the control valve 64, the heat or cold output rate of the absorption heating pump 10 may be regulated steplessly in the simplest possible way so that a good level of efficiency is secured.

If a heat transfer medium is used in the heat transfer circuit 52, which keeps liquid in the operation temperature range of the heat store and of the generation unit, in addition a circulating pump 66 will be used as part of the heat transfer circuit 52. If the pumping rate of the circulating pump is able to be controlled, the control valve 64 will not be needed.

On operation of the system of FIG. 1, the heat store, which is best designed as a high-temperature heat store, such as a ceramic material store or a cast iron store with an upper limit to the operation temperature of about 800° C., is charged up by the electrical heating elements 48 when there is only low loading of the public electricity system. The heat pump 10 is powered by taking heat energy from the heat store 46, such taking of heat and, for this reason, the heat output and/or cooling effect of the heat pump being independent in time from the charging of the heat store 46 and, using the control valve 64 or the pump 66, may be steplessly controlled.

The generation (or expulsion) unit 14 may, for emergencies, be designed with a standby heating apparatus 15, making possible operation of the heat pump 10 even if the heat store 46 has not yet been charged up, or if the heat energy, with which it was charged, has been used up.

FIG. 2 is a view of a modification of part of the heating apparatus 112 for a heating system of the type shown in FIG. 1. The heating apparatus 112 has a heat store 146 placed in a fire-box or combustion chamber 168, which has heat insulation 150 and a burner 170 within it, getting oil or gas fuel by way of a line 172. The heat store 146 is best designed as a high-temperature heat store, for example a ceramic material or cast iron store. Furthermore, it may be designed to be heated up by electrical heating elements 148 or by a heat transfer fluid, e.g. oil, which in turn is heated e.g. by concentrated solar heat or waste heat.

The chamber 168 is connected to a stack 174, able to be shut off by a shut down door 176, when burner 170 is not in operation for cutting heat losses. In stack 174 a heat exchanger 178 is placed for making use of the rest of the heat of the gases produced by burning, this heat being used, for example, for producing hot water. In place of a combustion chamber for liquid fuels or, in addition to such a chamber, it is furthermore possible to have a fire-box designed for solid fuels (coal, wood, waste material which may be burned) or for operation by hot waste gases or a heat transfer fluid connected to any suitable heat source. Furthermore, the heating system may be designed on the same lines of that of FIG. 1.

A further sort of store, which may be used with good effect, is a "sorption store", that is to say a form of store working with desorption and sorption of a working medium by or in a sorption medium, as for example with a $CaO/H_2O$ system. In the present case sorption stores which use zeolite as the absorption medium or material are preferred.

FIG. 3 is a view of a further embodiment of the system of the invention which operates with a sorption store. Parts which are the same as parts of the system FIGS. 1 and 2, are marked with part numbers, whose first figure is a 2, while the two last figures are the same as those used for the parts of the plant of FIGS. 1 and 2. For this reason, the account, now to be given of the plant of FIG. 3, is limited to parts of it which are different to those of FIGS. 1 and 2.

The heating apparatus 212 for the generation unit 214 of the heat pump 210 is designed in the system FIG. 3 as a heat pump joined up with the input of the main heat pump 210, and it has a sorption heat store 246, which is best designed for operation with zeolite as the sorption material and with water as the working medium. It would, however, be possible to make use of other absorption/working medium systems, as for example zeolite/$CH_3OH$, zeolite/$NH_3$, $CaO_2/H_2O$ systems or systems using their mixtures, of which details will be given later on. The heat store 246 has a liquid-tight housing 246a (which may be made up of the housing units or modules) in which the absorption material is placed (not shown). In the account now to be given, it is assumed that the absorption material in store 246 is zeolite and the working medium is $H_2O$. The housing is figured diagrammatically as a box, but in fact it will be made up of a number of modules, as is generally normal in the art.

The housing 246a is joined up with a working medium vapor output line 382, having a shut-off valve 382a, and going to a heating coil 340 in the generation unit 214 of the absorption heat pump 210. The outlet of the heating coil 340 is joined up with the working medium storing vessel 384, which, in the case of the working medium used (water) in the present example will, for this reason, comprise liquid water. The store vessel 384 has an outlet line 386 which is joined by way of a liquid/gas heat exchanger 387 (only to be used if necessary) and which is useful in the case of a high working medium vapor density in the evaporator 394, with a throttle valve 388 made up of a shut-down and control valve and which has its low pressure end joined by way of an evaporator 394 and the gas end of the heat exchanger 387 with a working medium inlet line 390 of the sorption store 246, which has a shut-down valve 390a. Between the inlet end of the heating coil 340 and the inlet of the storing vessel 384, a heat exchanger 392 may be advantageously be provided, from which heat may be taken for use.

In the heat store 246 there is furthermore a tube coil 254, used for taking off heat energy, which is stored in the heat source 246 as specific heat, and which is given off on input of the working medium as sorption heat. The tube coil 254 is joined up as part of a heat transfer medium circuit 252, which, for example, may be worked with water as the heat transfer medium and has an outlet line joined up with the outlet end of the tube coil 254. This outlet line 256 goes to a second heating coil 246, placed in the generation unit 214. The outlet side of the heating coil 240 is joined up by way of an outlet line 258, which has a heat exchanger 304 within it, with the inlet of a heat transfer medium storing vessel 260, whose outlet is joined by way of a control valve 264 (or with a controlled rate pump 266 having the function of pump 266, or the function of pump 66 in FIG. 1) with the inlet end of the tube coil 254.

An account will now be given of the operation of the heating apparatus of FIG. 3:

In the heat store 246, using the electrical heating system 248 and/or the burner 270 and/or by the input of heating air, hot waste gases, heat transfer fluid and the like, heat energy is stored. When this is done, vaporized working medium is generated from the absorption material in the heat store 246 and desorption heat and, furthermore, specific heat, are stored in the absorption material. On generation, valve 382a is opened and valve 390a shut. The vapor of the working medium goes through the heating coil 340 where it is condensed and the heat thereof goes into the generation unit 214 of the absorption heat pump 210. The working medium (water), now in a liquid form, is stored in the storing vessel 384. The control valve 388 is generally shut when charging up the heat store 246. If no operation or driving heat is needed for the heat pump 210, the working medium may be forced to give up its heat in the heat exchanger 392, for example for room heating or for producing hot water.

If, later on, heat is needed for the generation unit 214 of the heat pump 210 and/or cold (a cooling effect) is needed at the input of the evaporator 394, the working medium, controlled in its rate by the valve 388, designed as a shut-down and control valve, will go into the sorption heat store 246. The valve 382a is now shut and the valve 390a opened. The working medium will then be absorbed by the absorption material, giving off sorption heat, which is transported by the heat transfer circuit 252 to the heating coil 240 in the generation unit 214, and the heat pump 210 is now supplied with its driving or operation energy.

The heating coils 340 and 240 will, in the way of operation noted, give up heat to the generation unit 214 at different times.

When the heat store 246 has given up so much heat that the temperature of the heat transfer medium in the heat transfer circuit 252 is no longer at a high enough level for heating the generation unit 214, the rest of the heat may be taken from the heat store by way of the heat exchanger 304.

It has been noted earlier on that the heat inlet end of evaporator 394 may be used for cooling purposes. If, however, heat at a higher level, for example the heat of waste air or the like is on hand, the heat input end of the evaporator 394 may be heated to a relatively high temperature, this producing the useful effect that the temperature level in the heat store 246 will be moved towards higher temperature values and in the heat transfer circuit 252 correspondingly higher temperature will be available.

The heating apparatus 212 may, as noted earlier, be designed for operation as a simple sorption heat store, that is to say one without increasing the amount of heat, this offering the useful effect that a greater amount of the heat able to be used (useful heat) will be on hand for later sorption operation. In this case, the heating coil 340 may be bypassed by the valve 341 and generation will be undertaken at such low pressures in the generation unit 246 that condensation will take place in the heat exchanger 392 at the temperature of the atmosphere. The sorption operation will take place as noted and the useful heat, produced in this respect, will be taken off by way of the heat transfer medium circuit 252.

The system of FIG. 3 may be changed in design so that the heating coil 240 is shorted by a three-way valve 305, or may be dropped all together and then the heat transfer medium outlet line 256 will be joined with the heat exchanger 304 itself. In this case, on discharging the heat store 246, the heat will be taken from the system by way of the heat exchanger 304 as useful heat, that is to say heat which is to be used for example for cooking, washing, washing up, heating rooms or like purposes.

If the heat stored in the heat store 246 is only to be used for heating rooms, the heat transfer medium circuit 252 may be replaced by a blower or the like, controlledly blowing air through airways in the store 246.

In a further possible design, which, as well, has its own special useful effect, the system is designed without the heating coil 340 or, it is shorted by a three-way valve 341. The heat of condensation given up on charging the heat store 246 and filling the storing vessel 384 is, in this case, then only taken off by way of the heat exchanger 392 from the system to be used as "useful heat" (and not as waste heat).

Under certain conditions, for example if heat energy is needed at a generally high temperature, or the efficiency of the heat pump 210 is at a low level for heating purposes because of a very low outside temperature, all the useful heat may be taken from the system by way of the heat exchangers 304 and 392 at generally high temperatures.

In the case of the heating system of FIG. 3 it is, generally speaking, possible to do without the heat exchanger 387 and the evaporator 394. Because of the evaporator 394, which may be supplied with low quality heat at a low temperature, the working medium circuit may, however, be run with a very useful effect as a heat pump, and the heat, supplied by way of the heat transfer fluid circuit 252, is increased in amount by the amount of heat coming in by way of the evaporator 394. In the case of cooling, the cooling effect or cooling power is, in addition, increased by the heat taken up by evaporator 394. The heat store 246 is, for this reason, run in addition as the generation unit and as the absorber of a discontinuously run heat pump, that is to say the generation operation and the absorption operation may take place at different times in turn.

It is to be noted, in this connection, that the design of the heat pump 10 (FIG. 1) and, in the other case, 210 (FIG. 3) is not limited to a special sort of pump. For these heat pumps, it is possible to make use not only of continuously run pumps (as noted), but furthermore of pump designs run discontinuously as the word is used hereinbefore. In the case of a discontinuously run absorption heat pump, it is possible, as normal in the art, for different parts, which have been named separately, to be united with respect to function, for example the generation unit and the absorber and/or evaporator and condenser, something which will be made clear in more detail later, on using FIGS. 6 and 7.

We have pointed out earlier that the heating apparatus 212 supplying heat energy to the generation (or expulsion) unit 214, is run as a discontinuous heat pump with respect to the working medium circuit 382-392-384-388-394-390 with the sorption store 246. If in the heat store 246, which is operated alternatingly as an expulsion unit and absorber, zeolite is used as an absorption material, the outcome will be a heat pump system, which may be worked by itself, that is to say separate from any heat pump 210 at its output, because such a system is in the position of supplying useful heat at temperatures of the order of 100° C. and above. This is not practical with the old absorption medium/working medium systems of the prior art. With a NH$_3$/H$_2$O system, the useful heat may be produced with a temperature of 60° C. at the most and, in this case, the pressure of the working medium on generation will be as high as 30 bar. Although a LiBr/H$_2$O system makes possible higher temperatures of the useful heat, corrosion will then be serious and, because of increasing decomposition of the lithium bromide, the limit of the generation unit temperatures will be as low as about 150° C. A heat pump comprising zeolite as absorption material, on the other hand, can be used to convert heat of a higher temperature, for example within a temperature range of 150° to 300° C. and higher into a greater amount of heat of temperatures of about 100° C. The increase in heat is because of the "pumping up" of the low grade low temperature heat going to the evaporator 394 and taken for example from the free atmosphere, from ground water, an "energy roof" (one with environmental energy input) or the like.

On using the system 212 without any heat pump 210 joined up with its output, the heating coils 240 and 340 will not be present and the useful heat (or utilized heat) will be taken from the condenser 392 and the heat carrier circuit 252. The system 212 may furthermore take the place of the heat pump 10 in FIG. 1.

With the system having the heating apparatus 212 and the heat pump 210 joined up with its output (as in FIG. 3), it is possible for very high efficiencies to be produced. It is to be noted that not only for the heating apparatus 212, run as a heat pump, but furthermore for the heat pump 210 on its output side, in theory the efficiency factor (amount of high temperature input heat used for producing the low temperature output heat) is, in each case, 2.0. For general purposes, the heating apparatus may be taken to have an efficiency factor of 1.4 while the heat pump 210 will have an efficiency factor of 1.5, this giving an overall efficiency of 2.0. If the burner 270 is taken to have an efficiency of 0.8, something certainly possible with present-day oil or gas burners, the overall efficiency factor will be 1.7 for the primary energy made use of. The efficiency factor of the best prior art designs of absorption heat pump systems was only about 1.2.

If the zeolite is run with H$_2$O as a working medium—this generally being the best way of operation—there will be a danger of the working medium's (water) icing up at low outside temperatures in evaporator 394. Certain steps may then be taken for preventing this:

Firstly, an anti-frost material, as for example ethyleneglycol, may be used in the water in the evaporator 394. Secondly, the evaporator 394 may be bridged over or shunted by a valve so that, when the valve 386$a$ is opened, liquid water will go through line 390 into store 246.

With respect to operation of the system to be seen in FIG. 3, some further points are to be noted, namely:

(a) Heat may be taken from condenser 218 and/or absorber 234 and supplied to the evaporator 394. In the case of this form of the plant, the heat transfer medium from 218$a$ or 236 may firstly be run through 394$a$ before getting to the heat user or cooling tower K. In this way, a high temperature is produced in evaporator 394. To this end, the heat exchanger 394$a$ is joined by way of lines X and Y with heat exchangers 236 and 218$a$. In theory, the efficiency factor of the overall plant will then still be 3.0, the working power factor will be about 1.7 and for the efficiency of use of the primary energy there will then still be a factor of 1.36, taking into account the burner efficiency.

(b) The efficiency of heat pump 210 may be stepped up by using the evaporator 394 for:

1. further cooling of the liquid working medium before it gets to throttle valve 224, and
2. cooling the heat transfer medium, flowing through line 236, before it gets to the absorber 234 and/or cooling the heat transfer medium, running through 218a, before it gets into the condenser 218. In this case, the heat transfer medium in 218a or 236, respectively, will firstly go through the heat user or cooling tower K and, only afterwards, the evaporator 394. The resulting reduction of the inlet temperature of the heat transfer medium flowing into condenser 218 or into the absorber 234 respectively, will have the effect of increasing the amount of gas removed from or absorbed in the absorbing medium in heat pump 210.

(c) A further possible form for operating on heating is such that the sorption store 246 with its evaporator 394 is giving up so much heat by supplying heat to the evaporator from the surroundings (whose temperature may, for example, be 5° C.) that the temperature of the heating coil 240 is eventually no longer high enough for the generation of the working medium vapor in the generation unit 214; in the case of this form of operation, in theory the efficiency, as noted, of the system 210 to 212 is equal to 4.0. Then the heat transfer medium circuit, supplying evaporator 394 with input heat, will be switched over to condenser 218 and/or absorber 234 as a heat source, the efficiency in theory still being 3.0. Using this measure, the vapor pressure of the working medium in the sorption store 246 and, for this reason, the temperature, will be increased and the store may be forced to give up heat in this way to a greater degree by way of the heat transfer circuit 252 so that the generation unit 214 will again be getting working energy with a high enough temperature by way of heating coil 240.

What has been said so far in this respect has been, more generally, in connection with heating operation. Some observations are now made on operation with cooling:

The store 246 is charged with energy, the working medium undergoing generation and working energy being supplied to generation (or expulsion) unit 214 of heat pump 210 by way of heating coil 340 so that cold or cold power will be on hand at evaporator 230, it being supplied to a cold user W, that is to say something to be cooled. (In the cases of other forms of operation, W may be the surroundings).

On discharge of the store, cold power will be on hand, not only at the evaporator 230, but furthermore at evaporator 394. In theory, the efficiency of the compound system 210-212 will be 3, that is to say one unit of input heat coming to the sorption store 246 operating alternatingly as an expulsion unit and absorber, will, in theory, be responsible for producing three units of cold. If heat pump 210 has a cold efficiency of 0.7, something which is likely to be the true value for a lithium bromide water system, and the working efficiency of the input heat of the heating apparatus 212, changing the heat into operation heat for heat pump 210, is equal to 1.4, it will be seen that the overall cold efficiency is equal to $0.7 \times 1.4 + 0.4 = 1.38$. The amount 0.4 added on is the amount produced by evaporator 394.

For these reasons, even on using electricity for heating, the present system has an efficiency generally equal to the efficiency on operating a compressor refrigeration machine ($\eta$ equal to about 2.1) with electricity from a pumped storage hydroelectric plant ($\eta$ equal to about 0.65). In addition, the useful effects generally produced by decentralized plants are produced, the transmission lines of the public electricity system is freed of heavy peak loads and less electricity has to be produced at peak load times.

When, as discharge of the sorption store 246 goes on further, the temperature in the generation unit 214 will lastly not be high enough for operation of the heat pump 210, and the cold power may only be produced at evaporator 394. Heat pump 210 is then turned off and the cooling fluid, which is otherwise circulated through the condenser 218 and/or absorber 234, is now forced through the heat exchanger 304 so that store 246 may be completely discharged and, in evaporator 394, further cold power may be produced.

From a practical point of view, there may be much to be said for using the cold power of the evaporator 394 not as such, that is to say directly, but for increasing the efficiency of heat pumps 210 and 212, now running as a refrigerating machine, by making use of the measures of which an account has been given earlier in connection with heating operation as the ways of working arrangements (a), (b) and (c).

It should be pointed out that the disclosed zeolite absorption heat pump may be used, without any further cascaded heat pump (as 210), by itself for cooling or refrigerating and/or heating purposes, e.g. in an air conditioning apparatus. A preferred application of such one-stage zeolite heat pump is in an air conditioning apparatus of a vehicle, as a car, truck or bus, the heat pump being powered by the exhaust heat of the vehicle.

Some examples will now be given for design figures for the sorption store 246; in all cases the selection of the greatest temperature level for generation is to be such that the stability limit of the absorption material/working medium system used, for example of the zeolite, is not exceeded.

EXAMPLE I

Absorption material zeolite; working medium $H_2O$

Let the degree of saturation $\xi$ of the absorption medium be taken to be the ratio of the weight of the sorbed $H_2O$ to the weight of the zeolite in the desorbed condition.

| A Absorber operation cycle of the sorption store 246: | | | | |
|---|---|---|---|---|
| Sort of operation | a | b | c | d |
| evaporator 394 | | | | |
| working temperature (°C.) | 0 | 30 | 45 | 80 |
| working pressure (bar) | 0.006 | 0.04 | 0.1 | 0.5 |
| Absorber temperature (°C.) | | | | |
| for $\xi$ 0.05 | 180 | 220 | 240 | 280 |
| 0.10 | 125 | 170 | 190 | 240 |
| 0.20 | 80 | 120 | 140 | 180 |
| 0.25 | 40 | 65 | 80 | 130 |

Operation (a) is preferred for a low input temperature at evaporator 394, for example for producing ice or cooling purposes.

Operations (b) (c) and (d) are preferred for producing high output temperatures in the heat transfer circuit 252.

| B. Generation unit operation cycle of the sorption store 246 | | | | | |
|---|---|---|---|---|---|
| Sort of operation | a | b | c | d | e |
| Working pressure (bar) | 0.5 | 1 | 2 | 5 | 10 |
| working temperature (°C.) | 80 | 100 | 120 | 150 | 180 |

-continued

| B. Generation unit operation cycle of the sorption store 246 | | | | | |
|---|---|---|---|---|---|
| Sort of operation | a | b | c | d | e |
| of the condenser 340 | | | | | |
| Generation unit temperature range (°C.) for $0.25 > \xi > 0.05$ | 130 to 280 | 150 to 320 | 170 to 350 | 190 to 370 | 210 to 400 |

With some zeolites, generation may not take place up to the level at which $\xi$ is equal to 0.05, without a danger of going past the stability limit.

EXAMPLE II

| Absorption material: CaO | | | |
|---|---|---|---|
| Working medium: H$_2$O | | | |
| Sort of operation | a | b | c |
| A Absorber operation cycle | | | |
| evaporator temperature (°C.) | 0 | 30 | 45 |
| evaporator pressure (bar) | 0.006 | 0.04 | 0.1 |
| absorber temperature (°C.), approximate values | 200 | 300 | 350 |
| B Generation unit operation cycle | | | |
| generation unit pressure (bar) | 2 | 10 | |
| generation unit temperature (°C.) | 450 | 500 | |
| condenser temperature (°C.) | 120 | 180 | |

By using, in place of all or part of the CaO, Mg$_x$Ca$_{1-x}$O, and/or mixing in zeolite, the generation unit temperature may be lowered while keeping to the same generation unit pressue and the same condenser temperature. x may have values from about 0.1 to about 1.0.

Useful effects may be produced by having a division of the heat store for putting its heat capacity in line, for example, with changes in the heat need (or heat requirement) dependent on the seasons of the year. In summer, for example, a heat store will take a generally long time to become discharged, it having a heat capacity designed for winter operation and, because of this, the store would then be used for a generally long time at an undesirable low temperature range.

Division of the store furthermore makes possible a quasi-continuous operation by operating the sections of the store out of phase with each other; furthermore, the efficiency of the system may be increased by internal heat exchange between the parts of the store.

Figure 4:
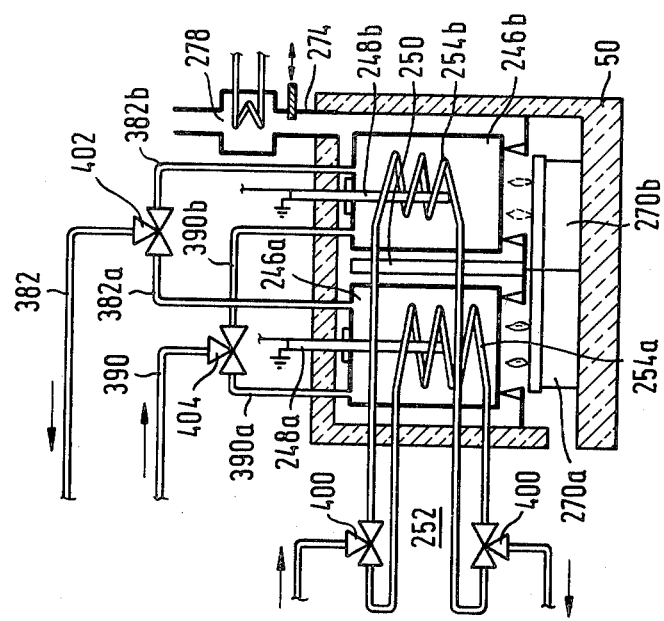
FIG. 4 is a diagrammatic view of a two-part heat store useful in a system in accordance with the present invention.
Figure 6:
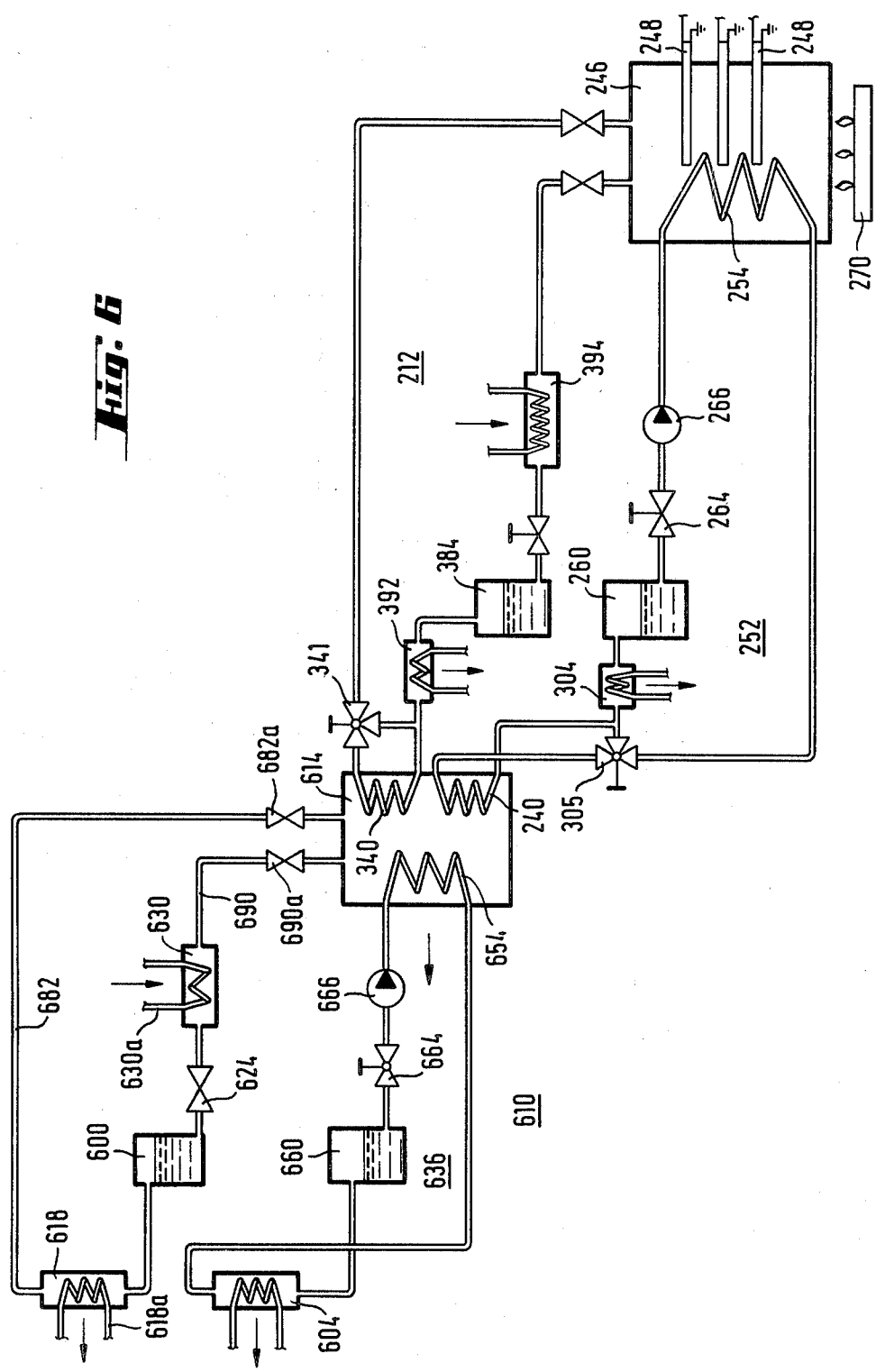
FIG. 6 is a diagrammatic view of a further preferred embodiment of the invention, comprising two cascaded absorption heat pumps and operating discontinuously.
Figure 7:
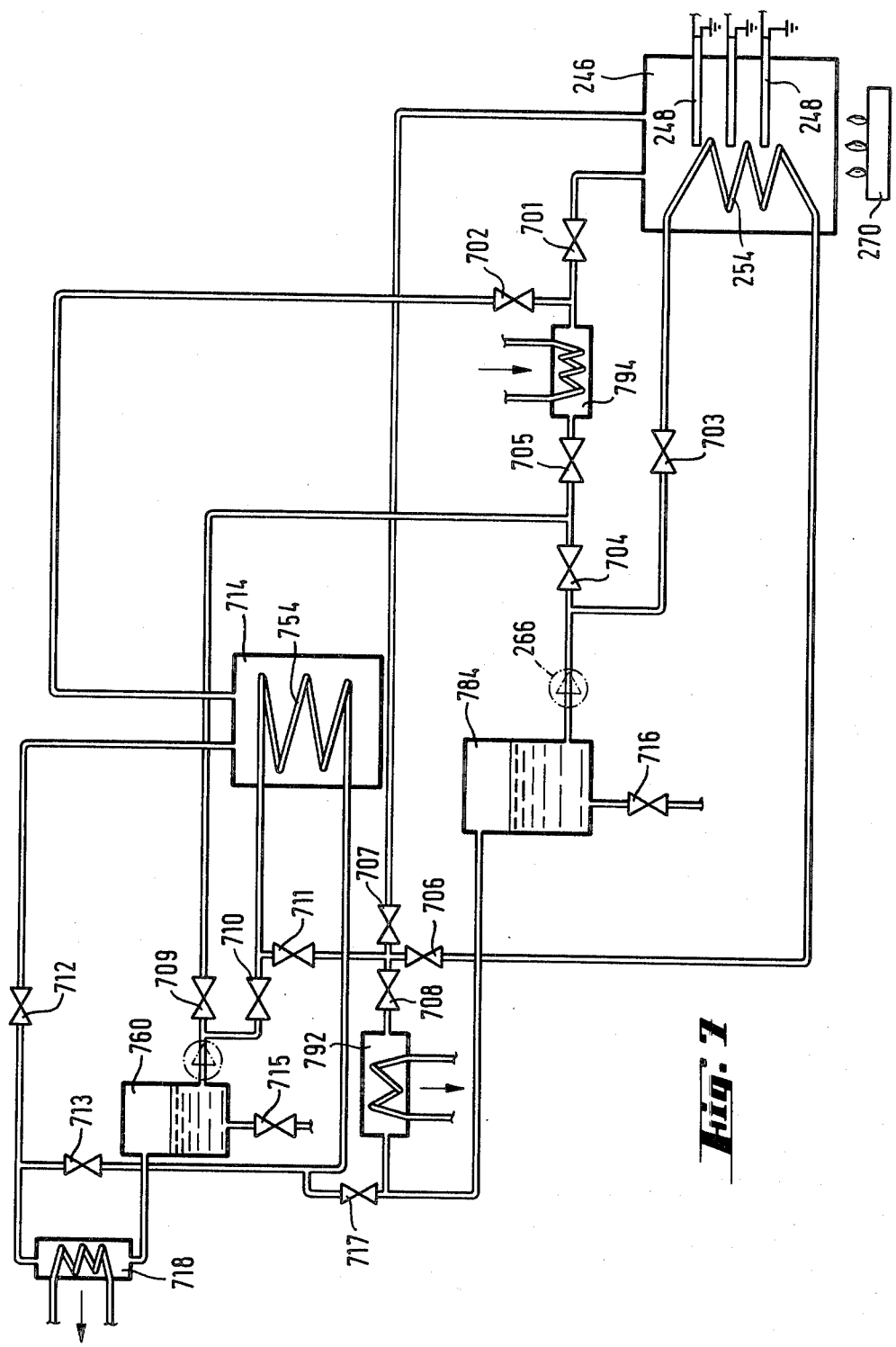
FIG. 7 is a view of a more simple embodiment of the type shown in FIG. 6.

FIG. 4 is a view, by way of example, of a sorption store of the sort noted in connection with FIG. 3, it being divided up into two halves 246a and 246b and which may be used in a system as in FIGS. 3, 6 and 7 and furthermore in the system of FIG. 1, if the heat pump 10 is a discontinuously run heat pump. Between the two store halves, there is heat insulation 250. Each store half has is own heating means, as electrical heater 248a (and 248b) and/or its own burner 270a (or 270b). In each store half, there is a tube coil 254a (and 254b) which may be put in the heat transfer medium circuit 252 (FIG. 3) as desired using three-way valves 400.

Each store half furthermore has a working medium outlet line 382a (and 382b) able to be connected to line 382 (FIG. 3) as desired using a three-way valve 402. On the same lines, each store half has a working medium inlet line 390a (and 390b) being able to be connected as desired to line 390, FIG. 3, by means of three-way valve 404.

A heating system with division of the heat store, to be seen in FIG. 4, may be worked in a number of different ways to good effect:

In times when the heat need (or requirement) is low, for example in summer, the heating plant may be operated with only one half of the store, that is to say only the one half, for example half 246a, is completely charged and discharged. Store losses will then be lower than on using the complete, full store. The other half 246b is out of operation.

Furthermore, in the case of a sorption store, the two halves may be used in turn as a generator and absorber so that it is then possible to have a quasi-continuous operation of the heat pump part of the heating apparatus 212 (FIG. 3). It is then possible, for this reason, for heat to be continuously taken off at heating coils 240 and 340 and at heat exchangers 304 and 392 while at evaporator 394 cold may be continuously produced.

A further useful effect of the division of the sorption heat store is that the heat energy, produced in the generation phase, may be re-stored by the inlet of working medium, having undergone generation, into the store part run as an absorber.

One part of the useful effects, of which an account has been given in connection with the division of a sorption store, will furthermore be produced on the division of other sorts of stores, such as ceramic material, cast iron and chemical stores.

In the case of in-turn (or alternating) operation of the two halves of the store, it is possible for waste heat, derived from stack gases and coming from the heat exchanger 278 (FIG. 4), to be supplied to evaporator 394 (FIG. 3). For this reason, the temperature level in the absorption phase will be increased, because a higher working medium vapor pressure will be produced.

A like increase in temperature will be produced on supplying the evaporator 394 with heat energy at a high temperature, derived from waste air from kitchens or the like.

Figure 5:
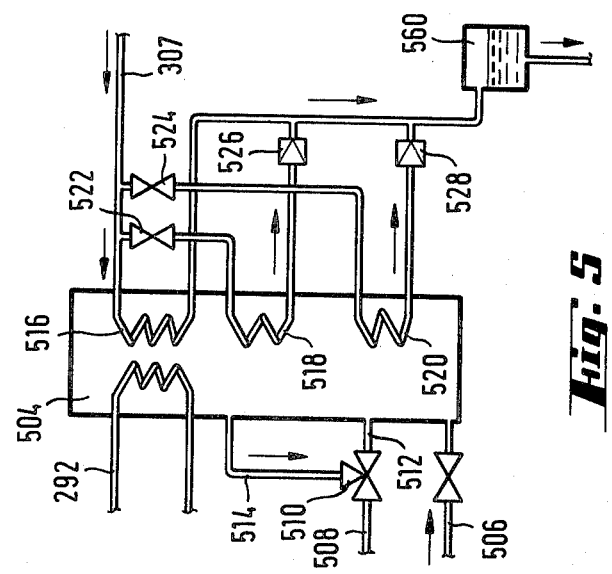
FIG. 5 is a view of a useful further embodiment of a heat exchanger for a system as in FIG. 3 or FIG. 4.

FIG. 5 shows a heat exchanger 504 which may be used with specially useful effects in place of heat exchanger 304 (FIG. 3). The temperature of the heat transfer medium in the heat transfer medium circuit 252 (FIG. 3) will undergo great changes in fact in the absorption operation cycle of the absorption, heat store 246. The exchanger 504 is a hot water heat exchanger supplied by way of line 506 with cold water and having a warm water output by way of line 508. Line 508 is joined by way of a three-way valve 510 with a lower and with an upper heat outlet connection 512 (and 514) of the water heater.

The water heater 504 has, for example, three heating coils 516, 518 and 520. The input end of heating coil 516 is joined by way of an input pipe 307 (see furthermore FIG. 3) with the heat transfer medium circuit 252. The inlet ends of the tube coils 518 and 520 may be joined by way of valves 522 and 524 as desired with the inlet pipe 307. The outlet end of the heating coil 516 is joined up with the inlet itself of the heat transfer medium store 560, while the outlet ends of the heating coils 518 and 520 are connected by two check valves 526 and 528, to the inlet of the heat vehicle medium store 560. When, at the start of the absorption cycle, the temperature of the heat transfer medium in the heat medium circuit 252 (FIG. 3) is still generally high, the heat transfer medium is only run through the heating coil 516 (FIG. 5), valves 522 and 524 being shut. With a drop in temperature then firstly the valve 522 and lastly valve 524 are opened and, for this reason, the temperature of the heat transfer medium is put in line with the different temperature levels of the water column in the water heater 504.

In FIG. 6 we have a further example of the invention having a heating apparatus 212 of the sort noted in connection with FIG. 3 and whose output is joined up with a heat pump 610, run discontinuously as the word is used herein. The heat pump 610 has a generator 614, heated by the heating apparatus 212 and which is run first as a generator and then as an absorber and so on. The working medium undergoing generation in the generation phase goes through a working medium output pipe 682, having a valve 682a, to a condenser 618, supplying useful or waste heat by way of a heat exchanger 618a, and is condensed here. The condensed, liquid working medium goes into a store vessel 600 (which, in function, is the same as the store vessel 384). From store vessel 600, the liquid working medium is supplied to evaporator 630 at a rate controlled by a control valve 624 acting as an expansion unit. Evaporator 630, which has a heat exchanger coil 630a therein, takes up heat so that a system, joined up with the exchanger coil 630a, may be cooled. The evaporated working medium then goes from evaporator 630 by way of a working medium inlet pipe 690 with a valve 690a, more specially taking the form of a check valve, back to the generator-absorber 614. The generator-absorber 614 furthermore has a unit for output of absorption heat freed on absorption of the working medium. This apparatus will be seen in FIG. 6 in the form of a heat transfer medium circuit 636 made up of:

- a heat exchanger coil 654, used for output of sorption heat, and placed in the generator-absorber 614,
- a heat exchanger 604 (for example a room heater, radiator or the like) for making use of the sorption heat so taken, or, at any rate, taking it out of the system,
- a heat transfer medium store or balancing (compensation) vessel 660,
- a control valve 664 and, if necessary, a circulating pump 666.

The generator-absorber 614 may, however, be so designed that the sorption heat freed on absorption may be taken from it straightway or directly, for example by blowing air through a tube system placed in it.

The generator-absorber 614 is run in a first phase (expulsion phase) as a generator, the valve 682a being opened and valve 690a being shut. The working medium, in the form of a gas and undergoing generation from the absorption material because of the input of heat from the heating apparatus 212, goes through pipe 682 into condenser 618, where it is condensed, giving up useful heat (that is to say heat to be utilized) and the condensed working medium is then taken up in store vessel 600. Control valve 624 and valve 690a are generally shut in this phase. The heat transfer medium circuit 636 is out of operation in this generation phase.

Then, or at some later point in time as desired, the generator-absorber is switched over to absorber operation. Valve 682a is shut, valve 690a is opened and, by way of control valve 624, liquid working medium, controlled in a way dependent on the need for heat and/or cold, is caused to go from store vessel 600 into evaporator 630. The evaporating working medium takes up heat so that a system, joined up with heat exchanger coil 630a, may be cooled. At the same time, absorption heat is freed in the generator-absorber 614 and this heat is taken off by way of heat transfer medium circuit 636 and made use of, for example, for heating water or it may be taken up by the surroundings.

Examples are now given of some absorption material-working medium systems, which may be used in the system of FIG. 6:

| Generator/absorber absorption material | working medium |
|---|---|
| 246 zeolite | $H_2O$ |
| 614 silica gel | |
| activated aluminum oxide | $H_2O$; $NH_3$; $CH_3OH$ |
| active carbon | $NH_3$; $CH_3OH$ |
| zeolite | $H_2O$; $NH_3$; $CH_3OH$ |

The heat transfer medium in circuit 252 may, for example, be water (steam) or oil.

Useful effects may furthermore be produced by not taking the heat of evaporation for evaporator 394 from the surroundings or a system to be cooled, but from the condenser 618 and/or the heat exchanger 604.

FIG. 7 is a diagrammatic view of a system of the sort noted in connection with FIG. 6, which, however, by uniting certain parts and compounding of the working medium circuits of the heat pump used as a heating apparatus, and of the heat pump on the output side, has been made even simpler. In this case, the working medium in the two heat pump circuits and the heat transfer medium in the heat transfer medium circuits has to be the same material, for example, $H_2O$.

The system of FIG. 7 includes a sorption store 246 operating in turn (or alternately) as a generator and absorber, the store 246 corresponding to that of the system of FIG. 3.

The system furthermore has an absorber-generator 714, performing the function of the generator-absorber 614 and having a heating coil 754 in it, which performs the functions of the heating and heat exchanger coils 240, 340 and 654 of the plant of FIG. 6. An evaporator 794 is used in connection with the generator-absorber heat stores 246 and 714, it taking over the function of the evaporators 394 and 630 (FIG. 6). It is supplied from a store vessel 760, the same in function as the store vesel 600 and store vessel 384 in FIG. 6.

A condenser 718 is used together with the generator-absorber 714, it having the same functions as the heat exchanger 604 and the condenser 618. The working medium condensed in it goes into a store vessel 760, the same in function as the store vessels 600 and 660 and, in part, the store vessel 384. The functions of the heat exchanger coils 240, 340 and 754 are taken care of by the single heat exchanger coil 754.

Furthermore, use is made of a heat exchanger 792 having the same functions as the heat exchangers 392 and 304.

These parts of the system noted are joined by pipes which have valves 701 to 713 and 717 in them. These valves are placed in circuit as given in FIG. 7. A table will now be given of the control of these valves in the different phases of operation of the plant of FIG. 7 (in which "o" has the sense of "open", and "-" has the sense of "shut").

TABLE OF VALVE POSITIONS IN FIG. 7

| Process step | 701 | 702 | 703 | 704 | 705 | 706 | 707 | 708 | 709 | 710 | 711 | 712 | 713 | 717 |
|---|---|---|---|---|---|---|---|---|---|---|---|---|---|---|
| (1) loading (supply of energy) | — | — | — | — | — | — | o | — | — | — | o | o | — | o |
| (2a) cooling down of 246 by generation in 714 | — | — | o | — | — | o | — | — | — | — | o | o | — | o |
| (2b) later cooling of 714 | — | — | — | — | — | — | — | — | — | o | — | — | o | — |
| (2') cooling down of 246 by heating water for use in house etc. in 792; cooling down of 714 at the same time | — | — | — | — | — | — | o | o | — | o | — | — | o | — |
| (3) first cold producing step by sorption 714 | — | o | — | — | o | — | — | — | o | o | — | — | o | — |
| (4a) second cold producing step by sorption in 246 (generation 714) | o | — | o | — | o | o | — | — | o | — | o | o | — | o |
| (4b) further part of second cold producing step producing water for house or the like in 792 cooling down of 714 | o | — | o | — | o | o | — | o | o | o | — | — | o | — |
| (5) third cold producing step by sorption in 714 | — | o | — | — | o | — | — | — | o | o | — | — | o | — |
| (6) producing same water level in 760 and 784 | — | — | — | o | — | — | — | — | o | — | — | — | — | — |

— = closed
o = open

The valves 715 and 716 are drain valves used for cleaning the store vessels 760 and 784. The taking of medium from the store vessel 760 for sorption not only in the generator-absorber 714, but furthermore in the sorption store 246, makes for a better efficiency in evaporator 794, because the average temperature level in vessel 760 is lower than in vessel 784.

In the case of the systems of FIGS. 6 and 7, it is possible to make use of a two-part heat store 246, as noted in connection with FIG. 4.

Heat pumps as noted, using zeolite as an absorption material, are responsible for very useful effects, more specially when operated quasi-continuously with a double store as in FIG. 4, both alone or with a heat pump 210 coupled with the output, for making use of the waste heat of an internal combustion engine. In this respect, the heat of the exhaust gases is used for generation or expulsion and the cooling water or cooling air heat (cooling fluid heat) is used for heating the evaporator (for example evaporator 394 in FIG. 3). Useful heat is produced, whose temperature is greater than that of the cooling fluid, so that the full waste or output heat of the engine is available at a higher temperature level. This heat may be used directly for heating purposes or, by way of an absorption heat pump (for example 210 in FIG. 2), for heating and/or cooling, more specially, if the engine, for its part, is driving a compressor heat pump.

The wording "storing with a temperature high enough for generation" is to have the general sense that the stored heat energy will be on hand or available at a high enough temperature on being taken from the heat store.

The heat exchanger elements supplying or removing heat to or from the various parts of the systems disclosed have been termed tube coils for the sake of simplicity. It is to be understood, however, that these elements may take other forms in a practical system, as the form of plate heat exchanger elements, finned tube sections and the like as well known in the art.

We claim:

1. A heat pump system including an absorption heat pump, comprising:
   a generator-absorber for generating a vaporized working medium from an absorption material and subsequently re-absorbing the working medium in the absorption material;
   heating means for heating the absorber-generator;
   a condenser for condensing the generated working medium;
   a storage vessel for storing the condensed working medium;
   expansion means for decreasing pressure and fixing the flow rate of the condensed working medium; and
   an evaporator for evaporation of the working medium, characterized in that:
   (a) the generator-absorber includes a zeolite as absorption material;
   (b) a heat output circuit is coupled to the generator-absorber for output, as useful heat, of the absorption heat given up on absorbing the working medium in the absorption material; and
   (c) the heating means in combination with the generator-absorber is so constructed that the condensation temperature in the condenser is of the order of 80° C. or higher.

2. In a heat pump system including an absorption heat pump, comprising:
   a generator-absorber for generating a working medium from an absorption material and subsequently re-absorbing the working medium in the absorption material;
   heating means for heating the absorber-generator;
   a condenser for condensing the generated working medium;
   a storage vessel for storing the condensed working medium;
   expansion means for decreasing pressure and fixing the flow rate of the condensed working medium;
   and an evaporator for evaporation of the working medium and having heat input means;
   characterized in that:

(a) the generator-absorber includes a zeolite as absorption material;

(b) a heat output circuit is coupled with the generator-absorber for output, as useful heat, of the absorption heat given up on absorbing the working medium in the absorption material; and (c) the heating means provides a generating temperature up to at least 200° C.

3. A heat pump system according to claim 2, in which the heating means provides a generating temperature of at least 250° C.

4. A heat pump system according to claim 1, or claim 2, or claim 3, in which the absorption material includes CaO or MgO or a combination of CaO and MgO in addition to zeolite, and in which the working medium is water.

5. A heat pump system including an absorption heat pump, comprising: a generator-absorber for generating a vaporized working medium from an absorption material and subsequently re-absorbing the working medium in the absorption material;

heating means for heating the absorber-generator;

a condenser for condensing the generated working medium;

a storage vessel for storing the condensed working medium;

expansion means for decreasing pressure and fixing the flow rate of the condensed working medium;

and an evaporator for evaporation of the working medium, and having heat input means;

characterized in that:

(a) the generator-absorber includes $Ca_xMg_{1-x}O$ as absorption material, with $0.1 < x < 1.0$;

(b) the working medium is water; and (c) a heat output circuit is coupled to the generator-absorber for output of the absorption heat given up on absorbing the working medium in the absorption material.

6. A heat pump system according to claim 5 in which the heating means in combination with the generator-absorber is so constructed that the condensation temperature in the condenser is of the order of 80° C. or higher.

7. A heat pump system according to claim 5 or claim 6 in which the heating means provides a generating temperature up to at least 200° C.

8. A heat pump system according to claim 7 in which the heating means provides a generating temperature of 250° C. or more.

9. A heat pump system including at least one absorption heat pump, the heat pump comprising:

generator means for generating a working medium from an absorption material by input of heat energy;

condenser means for condensing the generated working medium;

expansion means for expansion of the condensed working medium;

means for returning the working medium from the expansion means to the generator means;

the system further comprising heating means for providing the input heat energy necessary for generating the working medium from the absorption material of the heat pump generator means, the heating means comprising a zeolite heat store adapted for alternate operation as a generator and as an absorber, which is connected to the generator means of the heat pump by a control heat transmission system including:

a first heat transfer circuit connecting the heat store to the generator means in the absorption heat pump and including, in the direction of flow of a working medium expelled from the zeolite heat store a condenser comprising a first heat input device for the generator means of the heat pump, a storage vessel for condensed working medium, a control valve, and an evaporator connected back to the zeolite heat store; and a second heat transfer circuit 252 comprising a working medium evaporator heated by the zeolite heat store and connected in a circuit with a condenser comprising a second heat input device for the generator of the heat pump.

10. A heat pump system according to claim 9 in which the working medium for at least one of the heat transfer circuits is water.

11. A heat pump system according to claim 9 in which the working medium in each of the first and second heat transfer circuits is water.

12. A heat pump system according to claim 9, or claim 10 in which the heat pump comprises an absorption material/working medium system selected from the group:

$LiBr/H_2O$;
$LiBr/CH_3OH$;
$LiBr/ZnBr_2/CH_3OH$;
$NH_3/H_2O$;
$NH_3/H_2O/LiBr$; and
organic absorber material/Freon.

13. A heat pump system according to claim 12 in which the evaporator in the first heat transfer circuit is connected to an external heat source.

14. A heat pump system according to claim 9, or claim 10 in which the evaporator in the first heat transfer circuit is connected to an external heat source.

15. A heat pump system according to claim 9 in which the absorption material includes CaO or MgO or a combination of CaO and MgO in addition to zeolite, and in which the working medium is water.

16. A heat pump system according to claim 9 or claim 10 in which the expansion means of the heat pump comprises an evaporator which evaporates the working medium, and in which the means for returning the working medium to the generator means of the heat pump comprises:

absorbing means for re-absorbing the working medium in the absorption material for the generator means;

and pump means for pumping absorption material and absorbed working medium from the absorbing means to the generator means.

17. A heat pump system according to claim 16 and further comprising means for transferring heat from at least one of the condenser means and the absorbing means of the heat pump to the evaporator in the first heat transfer circuit for the heat store.

18. A heat pump system according to claim 9, in which the heat pump further comprises storage means, for storing the condensed working medium, interposed between the condenser means and the expansion means of the heat pump.

* * * * *

UNITED STATES PATENT AND TRADEMARK OFFICE
CERTIFICATE OF CORRECTION

PATENT NO. : 4,408,468
DATED : October 11, 1983
INVENTOR(S) : Georg Alefeld and Peter Maier-Laxhuber It is certified that error appears in the above—identified patent and that said Letters Patent is hereby corrected as shown below:

Front page, first column, item [30], cancel "Sep. 17" and substitute --Sep. 28--.

Signed and Sealed this

Ninth Day of April 1985

[SEAL]

Attest:

DONALD J. QUIGG

*Attesting Officer*     *Acting Commissioner of Patents and Trademarks*